Figure 1:
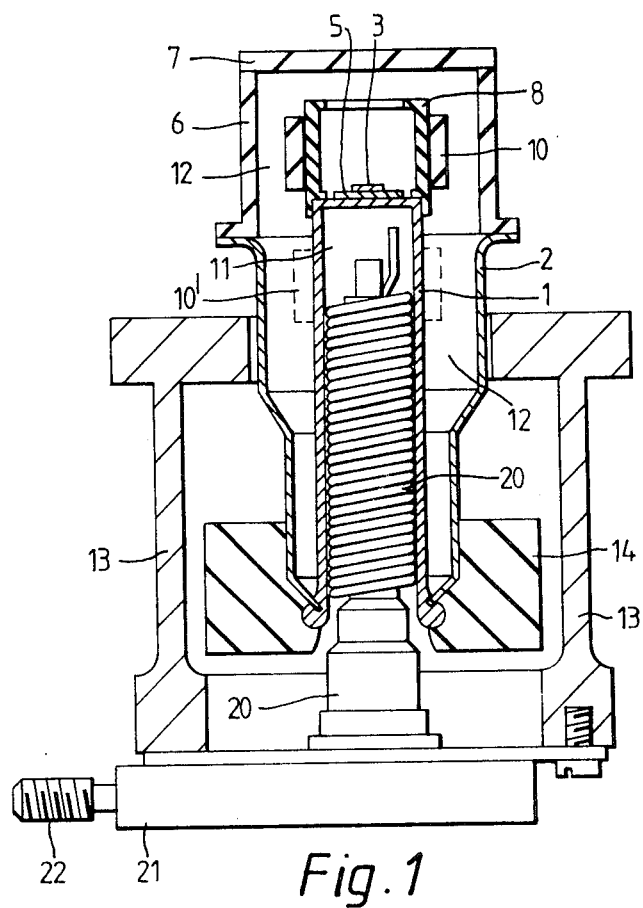

United States Patent [19]

Ball et al.

[11] Patent Number: 4,474,036
[45] Date of Patent: Oct. 2, 1984

[54] INFRA-RED RADIATION DETECTORS

[75] Inventors: Patrick J. R. Ball, Southampton; William A. E. Dunn, West Wellow, both of England

[73] Assignee: U.S. Philips Corporation, New York, N.Y.

[21] Appl. No.: 459,856

[22] Filed: Jan. 21, 1983

[30] Foreign Application Priority Data

Feb. 24, 1982 [GB] United Kingdom ............... 8205388

[51] Int. Cl.³ ............................................. F25B 19/00
[52] U.S. Cl. .................................. 62/514 R; 62/55.5; 250/352
[58] Field of Search .............. 62/55.5, 514 R, 514 JT; 250/352

[56] References Cited

U.S. PATENT DOCUMENTS

| 3,144,200 | 8/1964 | Taylor et al. | 62/55.5 |
| 3,769,806 | 11/1973 | Boissin et al. | 62/55.5 |
| 3,786,269 | 1/1974 | Cooper | 250/334 |
| 4,190,106 | 2/1980 | Dunmire et al. | 62/514 R |
| 4,344,302 | 8/1982 | Jarrett, Jr. et al. | 62/514 R |
| 4,408,469 | 10/1983 | Forth | 62/514 R |

Primary Examiner—Ronald C. Capossela
Attorney, Agent, or Firm—Norman N. Spain

[57] ABSTRACT

An infra-red radiation detector comprises an envelope in the form of a dewar (1,2) in which a vacuum space (12) is present between an outer wall (2) and inner wall (1) cooled by a cooling element (20). Gas molecules are gettered from the vacuum space (12) by at least one shaped molecular-sorbent porous body (10,10') having a major surface which fits onto and is bonded to a cooled surface (e.g. of a radiation shield 8) associated with the cooled inner wall (1). The shaped getter body (10,10') is secured (e.g. by epoxy adhesive) at its major surface to this cooled surface in a heat-exchange relationship so as to be cooled by the cooling element (20) during operation of the detector. The shaped getter body (10,10') is preferably a moulded annulus of synthetic zeolite material.

8 Claims, 2 Drawing Figures

INFRA-RED RADIATION DETECTORS

This invention relates to infra-red radiation detectors comprising an envelope in the form of a dewar, and relates particularly to the provision of a getter for gettering gas molecules from the vacuum space of the dewar.

Infra-red radiation detectors commonly comprise a dewar envelope having an inner wall and an outer wall, a vacuum space being present between the inner and outer walls; the inner wall defines an inner chamber of the dewar; at least one infra-red radiation detector element is mounted in the vacuum space and on the end face of said inner wall; a cooling element is provided in the inner chamber and serves to cool said inner wall and the detector element mounted thereon during operation of the detector. The cooled inner wall is often termed "the cold finger" of the detector.

It is known that a prime cause of detector failure is the gradual degeneration of the vacuum in the space between the inner and outer walls due to internal outgassing of the various component parts of the detector exposed to the vacuum. This degeneration in the vacuum eventually leads to the situation in which the cooling element is no longer able (at least in an efficient manner) to cool the detector element sufficiently fast to the desired temperature for efficient detection of the infra-red radiation. Thus, the detector lifetime is curtailed. In order to reduce this effect of internal out-gassing it is known to provide at least one getter in the vacuum space for gettering gas molecules from this space.

One example of an infra-red radiation detector incorporating a getter to maintain a vacuum in a dewar is described in U.S. Pat. No. 3,786,269. Its detector element array is cooled by a Stirling cycle refrigerator at approximately 50° K. In this particular detector a series of chemically active getters are mounted around the outer perimeter of the outer wall and protrude through into the vacuum space between the outer wall and the cold finger. However, in order to getter sufficiently large quantities of gas such chemically active getters need to have a large surface area and are bulky; this can present a dimensional size problem in the spacing of the inner and outer walls and/or the shape of the outer wall. Furthermore such chemically active getters are activated by being taken to a very high temperature (for example 900° to 1,000° C.) after evacuating and sealing the dewar envelope. For this reason the getter is mounted in the outer envelope wall with external electrical connections, and a large spacing is required between this type of getter and the detector element which could otherwise be damaged by the very high temperature. These factors lead to an increased size for the dewar envelope and even the adoption of unconventional dewar envelope outlines.

According to the present invention an infra-red radiation detector comprising an envelope in the form of a dewar having a vacuum space present between inner and outer walls of the dewar, the inner wall being cooled by a cooling element during operation of the detector, at least one infra-red radiation detector element being mounted in the vacuum space and on said inner wall, and at least one getter provided in the vacuum space for gettering gas molecules from the vacuum space, is characterized in that the getter is in the form of at least one shaped body of molecular-sorbent porous material arranged around a cooled annular surface which is associated with the inner wall of the dewar and which is cooled by the cooling element during operation of the detector, said getter body being so shaped as to have a major surface which fits onto and is bonded to said cooled surface in a heat-exchange relationship so as to be cooled by the cooling element during operation of the detector.

The use of molecular-sorbent porous bodies as getters is known, and reference is invited to, for example, the book entitled "Zeolite and Molecular Sieves" by D. W. Breck published in 1974 by John Wiley and Sons, Inc., New York, London and Sydney for a general background description of such porous molecular sorbents. It is known to use molecular-sieve getters in the form of loose beads or loose pellets retained behind a screen or in a cage, and for two examples of such use reference is invited to U.K. Pat. (GB-A) No. 921,273 which relates to liquefied gas storage containers and to U.K. Pat. (GB-A) No. 1,192,897 which relates to circuit breakers. However, the present invention relates to infra-red radiation detectors and involves providing one or more shaped getter bodies of molecular-sorbent porous material which are arranged around a cooled surface associated with the inner wall of the infra-red detector dewar and which are shaped to have a major surface which fits onto and is bonded in heat exchange relationship with the cooled surface. Such a getter in accordance with the present invention can be accommodated satisfactorily in the detector dewar near the detector elements and without impairing the mechanical and optical characteristics of the infra-red radiation detector, can have a high sorption capacity without being so bulky as to require an increased spacing between the inner and outer walls of the detector dewar, and can be efficiently cooled by the cooling element so as to have a high sorption efficiency and a fast cool-down time, even when the inner wall is merely cooled to moderate cryogenic temperatures, for example not less than 50° K. This last feature is important since in general the sorption efficiency of a molecular-sorbent porous getter increases with cooling at cryogenic temperatures, whereas the sorption efficiency of chemically-active getters increases at higher temperatures, for example around room temperature (300° K.) and above. Furthermore, as is known, molecular-sorbent getters do not require activation heating to very high temperatures after mounting in a vacuum space so that the getter can be mounted in the proximity of the detector element so as to obtain maximum cooling of the molecular-sorbent porous body.

A most efficient cooling of the shaped molecular-sorbent porous getter body can be achieved when the body is mounted around the inner wall of the detector dewar in a vicinity where the inner wall is directly cooled by the cooling element. The shaped getter body or bodies of molecular-sorbent porous material may be bonded to an outer surface of the inner wall, and/or any other cooled surface associated with the inner wall. Thus, an annular radiation shield may be mounted at the end of the inner wall around the detector element, and the cooled surface to which at least one said shaped getter body is secured may be an outer surface of the radiation shield.

An advantage of fitting the shaped getter body or bodies of molecular-sorbent porous material around a cooled surface of annular configuration is that this permits a large gas-sorption volume to be incorporated in an efficient manner in the vacuum space, particularly around the cold finger of the detector dewar envelope. In this case, the getter body itself is also preferably shaped in the form of an annulus in order to simplify the assembly process steps and to provide a maximum amount of molecular-sorbent material in a minimum space. However it should be noted that more than one body each extending only partially around such an annular cooled surface can be assembled together to form an annular getter in a detector in accordance with the invention. Furthermore it should be noted that the expressions "annular" and "annulus" as used in the present description and claims are not restricted to circular geometries, even although it is generally convenient to use a circular geometry at least for the inner wall itself of a detector dewar envelope.

Figure 2:
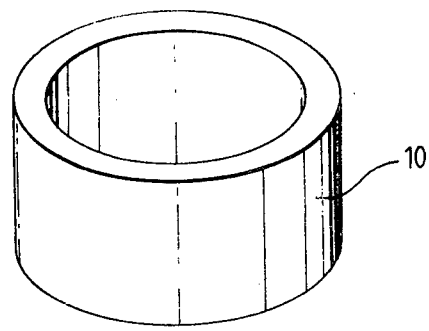

An embodiment of the present invention will now be described, by way of example, with reference to the accompanying diagrammatic drawing, in which:

FIG. 1 is a partly cross-sectional view and partly side view of an infra-red radiation detector in accordance with the invention, and FIG. 2 is a perspective view of one example of the body of a molecular-sorbent getter of the detector of FIG. 1.

It should be noted that these Figures are not drawn to scale, and the relative dimensions and proportions of some parts have been greatly exaggerated or reduced for the sake of clarity and convenience in the drawing. Furthermore, some parts of the detector which it is not necessary to describe for an understanding of how to perform the present invention have not been shown in the drawings, but may be provided in known manner.

The infra-red radiation detector of FIG. 1 comprises a dewar envelope 1,2, having an inner wall 1 and an outer wall 2. The inner wall 1 defines an inner chamber 11 of the dewar envelope, and a vacuum space 12 is present between the inner and outer walls 1 and 2. At least one infra-red radiation detector element 3 is mounted in the vacuum space 12 and on the end face of the inner wall 1. The detector element or elements 3 may be of known type and may be secured in known manner to a substrate 5, for example of sapphire, on this end face.

The dewar envelope 1,2 may be of known type. The inner wall 1 may be of glass the thickness of which may be for example 0.5 mm, and the outer wall 2 may be of for example metal. Although not shown in the drawing the inner glass wall 1 includes in known manner electrical conductors which are either on its outer surface or embedded in that surface. These conductors are electrically connected to electrodes of the detector element 3 adjacent the end face of the inner wall 1, extend along the length of the inner wall 1 and pass outside the dewar envelope 1,2 where they are electrically connected in known manner to external connections for the detector. The outer wall 2 of the dewar comprises an end portion 6,7 which is not sealed to the remainder of the dewar envelope 1,2 until after mounting and connecting the detector element 3. The end face 7 of the outer wall 2 consists of a window transparent to infra-red radiation. An annular radiation shield 8 is also included around the detector element 3 in known manner. After sealing the end portion 6,7 to the remainder of the outer wall 2 the space 12 between the walls 1 and 2 is evacuated in known manner.

The inner wall 1 of the dewar envelope defines the inner chamber 11 into which an elongate cooling element 20 is inserted and along which it extends towards the end face of the inner wall 1 for cooling the detector element 3 in known manner during operation of the detector. The radiation shield 8 in the embodiment illustrated by way of example in FIG. 1 is also mounted on the inner wall 1 so as to be cooled by the cooling element 20.

The cooling element 20 may be a known type of cryostat which is designed to utilize, for example, the refrigerating capability of the Joule-Thomson effect. This involves bleeding a fluid under pressure through a valve or other orifice into an area of lower pressure. When the fluid expands it absorbs heat in the low pressure area thus producing the cooling effect. The inner chamber 11 of the dewar envelope 1,2 adjacent the end face constitutes the low-pressure area. The cryogen fluid which may be for example dry air, nitrogen, or argon is supplied to the cooling element 20 via an inlet 22 of a mount 21. This mount 21 may be constructed in the manner disclosed in published European Patent Application (EP) No. 0006277 to which reference is invited.

The inlet 22 communicates with the helically-wound tubing of the cooling element 20 so that the moving fluid progressively encircles the element 20 and finally escapes from the orifice at the free end of the cooling element 20 adjacent the end face at which the detector element 3 and radiation shield 8 are mounted. As a result of its expansion during escape the fluid temperature is lowered until the desired temperature level is reached. Before escaping through the open mouth of the dewar envelope 1,2, the cold fluid in the inner chamber 11 circulates around the helical tubing of the element 20 so as to pre-cool the incoming fluid. Using such a cooling element 20, the detector element 3 may be cooled to a temperature of, for example, about 80° K. The temperature of the radiation shield 8 is generally somewhat higher, depending on the thermal conductance along the wall of the shield 8 and its mode of securement to the end of the inner wall 1 of the detector dewar.

The envelope arrangement of FIG. 1 also comprises a dewar-mount 13 in which the dewar envelope 1,2 is partially accommodated. The mount 13 may be of for example aluminum and may be partially filled with for example silicone rubber 14, particularly around the electrical connections for the detector element 3. The dewar envelope 1,2 is secured in the mount 13 by for example a suitable brazed joint between the flange of the mount 13 and the outer wall 2 of the dewar envelope. The mount 21 of the cooling element 20 may be attached to this dewar-mount 13 in known manner, for example by bolts.

Before sealing the end portion 6,7 to the remainder of the outer wall 2, at least one getter 10, 10' is provided in the space 12 between the walls 1 and 2. After sealing the end portion 6,7 and evacuating this space 12 using a vacuum pump, the getter serves to maintain the vacuum by gettering gas molecules produced in the vacuum space 12 by the gradual out-gassing of the various component parts of the detector exposed to the vacuum.

In accordance with the present invention, the getter is in the form of at least one shaped body 10,10' of molecular-sorbent porous material so shaped as to have a major surface which fits onto and is bonded to a cooled surface associated with the inner wall 1 and cooled by the cooling element 20. In the example illustrated in FIG. 1, the cooled surface on which the getter body 10 is mounted is an outer surface of the annular radiation shield 8. The body 10 is of porous synthetic zeolite material which is also known by the expression "molecular-sieve", as described in for example the previously mentioned book by D. W. Breck. Zeolite materials like those mentioned in GB-A No. 1,192,897 and GB-A No. 921,273 may be used to form the getter body 10. The porous molecular-sorbent material is moulded with an inert binder into the shape of an annulus as illustrated in FIG. 2. Its dimensions are such that the annular body 10 is a loose-fit around the outer surface of the cooled radiation shield 8. The inner major surface of the body 10 is bonded to this outer surface of the shield 8 in a heat-exchange relationship so as to be cooled by the cooling element 20 during operation of the detector. The body 10 is preferably secured to the shield 8 by a thin intermediate film of adhesive such as epoxy, in order to ensure a good large-area thermal contact between the inner major surface of the annular body 10 and the outer surface of the cooled shield 8 and to prevent the body 10 slipping off the shield 8 during handling or operation of the detector.

In one particular example of a detector in accordance with the invention and having the arrangement illustrated in FIGS. 1 and 2, the vacuum space 12 between the inner and outer walls 1 and 2 may have a volume of 10 cm$^3$ with a vacuum having a residual gas pressure of less than $10^{-2}$ pascal; the annular radiation shield 8 may be of circular configuration with an outer diameter of approximately 1.0 cm; as illustrated in FIG. 2 the annular body 10 may also be of circular configuration with an inner diameter of approximately 1.0 cm, a length of approximately 0.5 cm, and a thickness of approximately 0.1 cm. An annular body 10 having such a thickness can be readily accommodated in the vacuum space 12 having a typical distance of 0.4 cm between the outer surface of the shield 8 and the inner surface of portion 6 of the outer wall 2.

The moulded body 10 is generally very fragile so that the radiation shield 8 provides an important mechanical supporting function at the inner major surface of the body 10. Typically the synthetic zeolite body 10 is composed of particles having a width of at most a few micrometers and with somewhat irregular inter-particle voids also in the body 10. The pores of the porous zeolite particles forming the body 10 have a width comparable to molecule sizes (up to approximately 0.5 nm) of gases in the vacuum space 12 and were formed by driving off the water of crystallization of the zeolite material before moulding the zeolite particles together in an annular shape to form the body 10; the heating required to effect this dehydration is thus performed before mounting the getter 10 in the dewar envelope 1,2. The resulting molecular-size pores permeate the zeolite particles to give an extremely large internal surface area, as a result of which the cooled body 10 can absorb a large volume of gas by adsorption on the inner surfaces of the pores.

Since the cooling element 20 cools the radiation shield 8 to only a moderate cryogenic temperature, the good large-area thermal contact between the inner major surface of the body 10 and the outer surface of the shield 8 is particularly important in efficiently cooling the molecular-sieve body 10 to obtain a high sorption efficiency. The annular configuration described for both the body 10 and the cooled surface (formed by the shield 8) also minimises the amount of epoxy adhesive used to secure the body 10 to the shield 8; this is important since a large amount of epoxy can increase outgassing into the vacuum space 12. In a particular example the epoxy film may be typically 100 micrometers thick. The thermal conductance of thick epoxy films can be increased by using an epoxy loaded with silver or other thermally conductive material.

The porous molecular-sorbent shaped body or bodies can be secured in accordance with the invention to any appropriate cooled surface associated with the inner wall 1 of the dewar envelope 1,2. Thus, a similar porous body of synthetic zeolite material may be secured in similar manner to the outer annular surface of the inner wall 2 itself, for example, as illustrated by reference 10' and the associated broken outline in FIG. 1. Such a body 10' may be provided either instead of, or in addition to, the body 10 mounted on the radiation shield 8. Surprisingly the inventors have found that when an annulus 10' of zeolite material is bonded around the outer surface of the inner wall 1 in the vicinity of the cold end of the cooling element 20 the gettering efficiency is significantly improved compared with an identical body 10 bonded to the radiation shield 8 beyond the end of the inner wall 1. Depending on the actual temperatures to which the radiation shield 8 and inner wall 1 are cooled, the gettering capacity for identical bodies 10 and 10' may be as much as ten or more times greater when the body is mounted where the wall 1 is directly cooled by the cooling element 20 as compared with being mounted on the radiation shield 8 beyond the end of the wall 1. This provides an illustration of the importance of obtaining a good heat exchange relationship in the mounting of the getter body 10' and/or 10 for infra-red radiation detectors which are cooled to only moderate cryogenic temperatures. However, even when the body 10 is mounted on the radiation shield 8 beyond the end of the inner wall 1 a satisfactory gettering efficiency can be achieved in accordance with the present invention by means of the annular arrangement of the getter body or bodies on the cooled surface of the shield 8 and the shape of the getter body or bodies having a major surface which fits onto and is bonded to the cooled surface in a heat exchange relationship.

In infra-red radiation detectors of this type it is not satisfactory to incorporate a molecular sieve getter in the form of loose beads or loose pellets in a cage around the radiation shield 8 or the inner wall 1, and such a loose-particle form of getter is not in accordance with the present invention. Such loose particles would not have sufficient heat exchange with the cooled surface of the wall 1 or shield 8 to function as an adequate high-speed getter in the vacuum space 12 of infra-red radiation detectors which are only cooled to moderate cryogenic temperatures. The present invention however permits efficient heat exchange to be obtained as a result of the getter body 10,10' having a shaped major surface which is bonded to and matches the contour of the cooled surface. The annular configuration optimises the area of the bonded surface in relation to the thermal mass of the getter so that fast cooling of the getter body 10,10' to the operating temperature can be achieved. This is particularly important for reducing the cooling power required for infra-red radiation detectors, in the operation of which it is often desirable for the pressure in the vacuum space 12 to be reduced to below $10^{-3}$ Torr within, for example, 30 seconds.

A loose-particle form of getter is also bulky and would be difficult, sometimes even impossible, to accommodate in a narrow vacuum space 12 of an infra-red radiation detector dewar. It would also be difficult to ensure that the detector elements 3 or the optical window 7 do not become obscured with dust from the loose particles. The bonded annular configuration of the shaped getter bodies 10 and 10' in accordance with the invention provides and advantageous mechanical structure which is compact, can withstand mechanical shocks and does not cause significant fatigue of the inner wall 1 of the dewar during vibration of the detector.

Many modifications are possible within the scope of the present invention. Thus, for example, the radiation shield 8 may have an extended lower part which overlaps the inner wall 1, and the shaped body 10' may be bonded to this extended part of the shield 8 so as to be mounted around the inner wall 1 where the inner wall 1 is directly cooled by the cooling element 20. Instead of a single body 10 forming a complete annulus, an annulus which is split radially into two or more separate bodies may be used, these separate bodies being individually secured around the outer surface of the radiation shield 8 by epoxy adhesive between their inner major surface and the outer surface of the shield 8. The total assembly of these individual getter bodies may form a substantially complete annulus or a discontinuous configuration with gaps. The assembling together of such individual bodies, complicates the manufacture of the detector and so in general is not as preferably as the use of a single annular body. However when the detector comprises two or more of the shaped getter bodies, for example in the form of separate annuli 10 and 10' or an assembly of separate bodies in an annular configuration, it may be advantageous in some cases for the bodies to have different affinities for different gas molecules.

If desired, the body 10 may be formed in situ by depositing the molecular-sorbent material on the outer surface of the radiation shield 8, before mounting the shield 8 in the dewar envelope 1,2; in this case an intermediate epoxy adhesive layer is not used. Molecular-sorbent porous materials other than synthetic zeolites may be used, for example silica gel.

The cooling element 20 in the inner chamber 11 of the dewar envelope 1,2 need not be a Joule-Thomson cooler, but many other known cooling elements 20 may be used instead. Thus, in one form the cooling element may be a Stirling cycle refrigerator. In another form so-called liquid transfer cooling may be used, in which case the cooling element may comprise an assembly of two straight concentric tubes which extends into the inner chamber of the dewar envelope 1,2; the cryogen fluid which may be for example liquefied nitrogen or liquefied dry air is fed into the inner chamber 11 via the inner tube along which it is transported in droplet form towards the end face; the fluid is vented through the outer tube which usually contacts the inner wall 1 of the dewar envelope 1,2 via for example rubber sealing rings. Another possible form of cooling element which may be used is an element used for so-called bulk liquid cooling which may comprise a single tube extending into the inner chamber 11 of the dewar envelope 1,2 for introducing liquid cryogen in contact with the end face.

What we claim is:

1. An infra-red radiation detector comprising an envelope in the form of a dewar having a vacuum space present between inner and outer walls of the dewar, the inner wall being cooled by a cooling element during operation of the detector, at least one infra-red radiation detector element being mounted in the vacuum space and on said inner wall, and at least one getter provided in the vacuum space for gettering gas molecules from the vacuum space, characterized in that the getter is in the form of at least one shaped body of molecular-sorbent porous material arranged around a cooled annular surface which is associated with the inner wall of the dewar and which is cooled by the cooling element during operation of the detector, said getter body being so shaped as to have a major surface which fits onto and is bonded to said cooled surface in a heat-exchange relationship so as to be cooled by the cooling element during operation of the detector.

2. A detector as claimed in claim 1, further characterized in that at least one said shaped getter body is mounted around the inner wall of the dewar in a vicinity where the inner wall is directly cooled by the cooling element.

3. A detector as claimed in claim 2, further characterized in that the cooled surface to which the at least one said shaped getter body is secured is an outer surface of the inner wall.

4. A detector as claimed in claim 1, further characterized in that an annular radiation shield is mounted at the inner wall around the detector element, and the cooled surface to which at least one said shaped getter body is secured is an outer surface of the radiation shield.

5. A detector as claimed in claim 1, further characterized in that one said shaped getter body is in the form of an annulus, the inner face of which forms said major surface and is shaped to fit around said cooled surface.

6. A detector as claimed in claim 1, further characterized in that said at least one shaped getter body is secured to the cooled surface by an adhesive film.

7. A detector as claimed in claim 6, further characterized in that the adhesive film is of epoxy.

8. A detector as claimed in claim 1, further characterized in that the getter is a moulded body of synthetic zeolite material.

* * * * *